Patented Mar. 11, 1924.

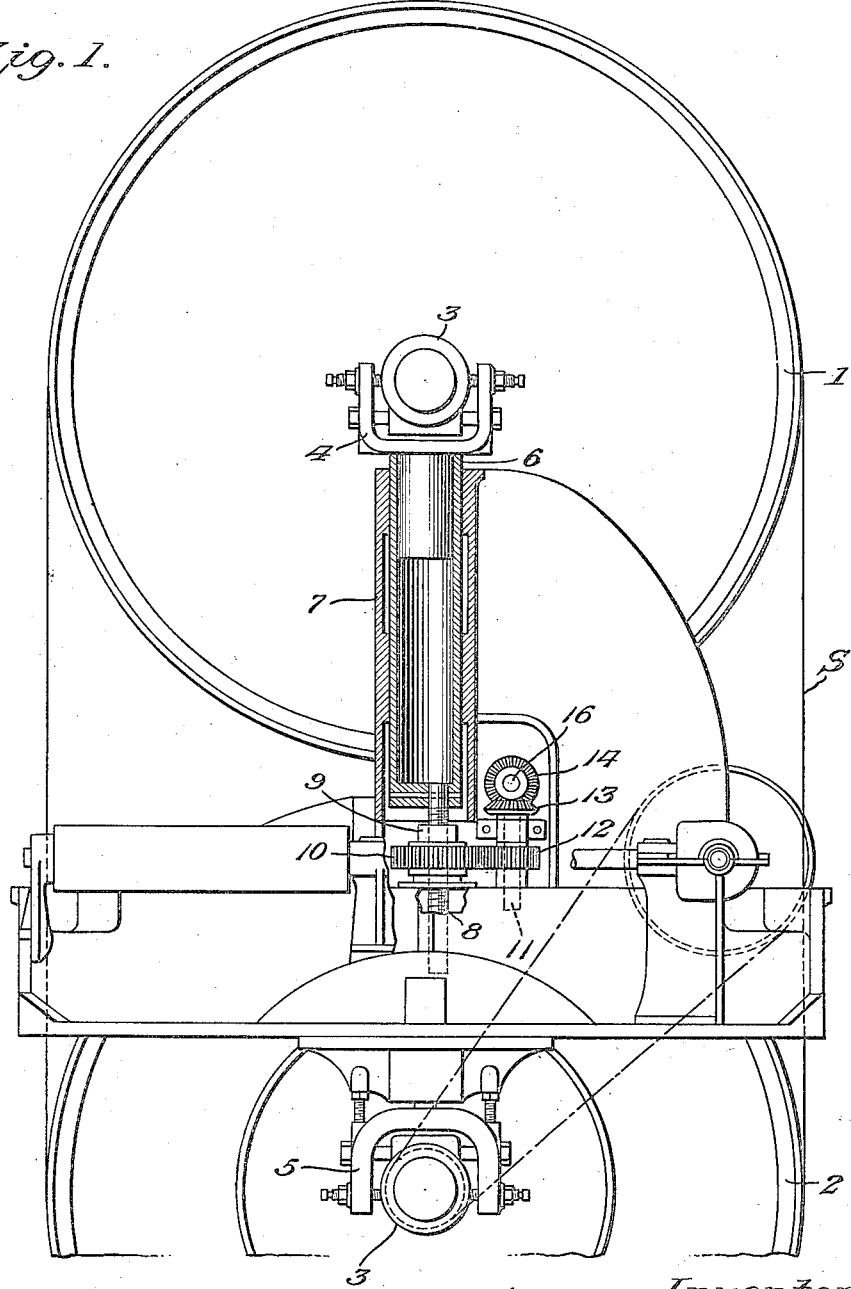

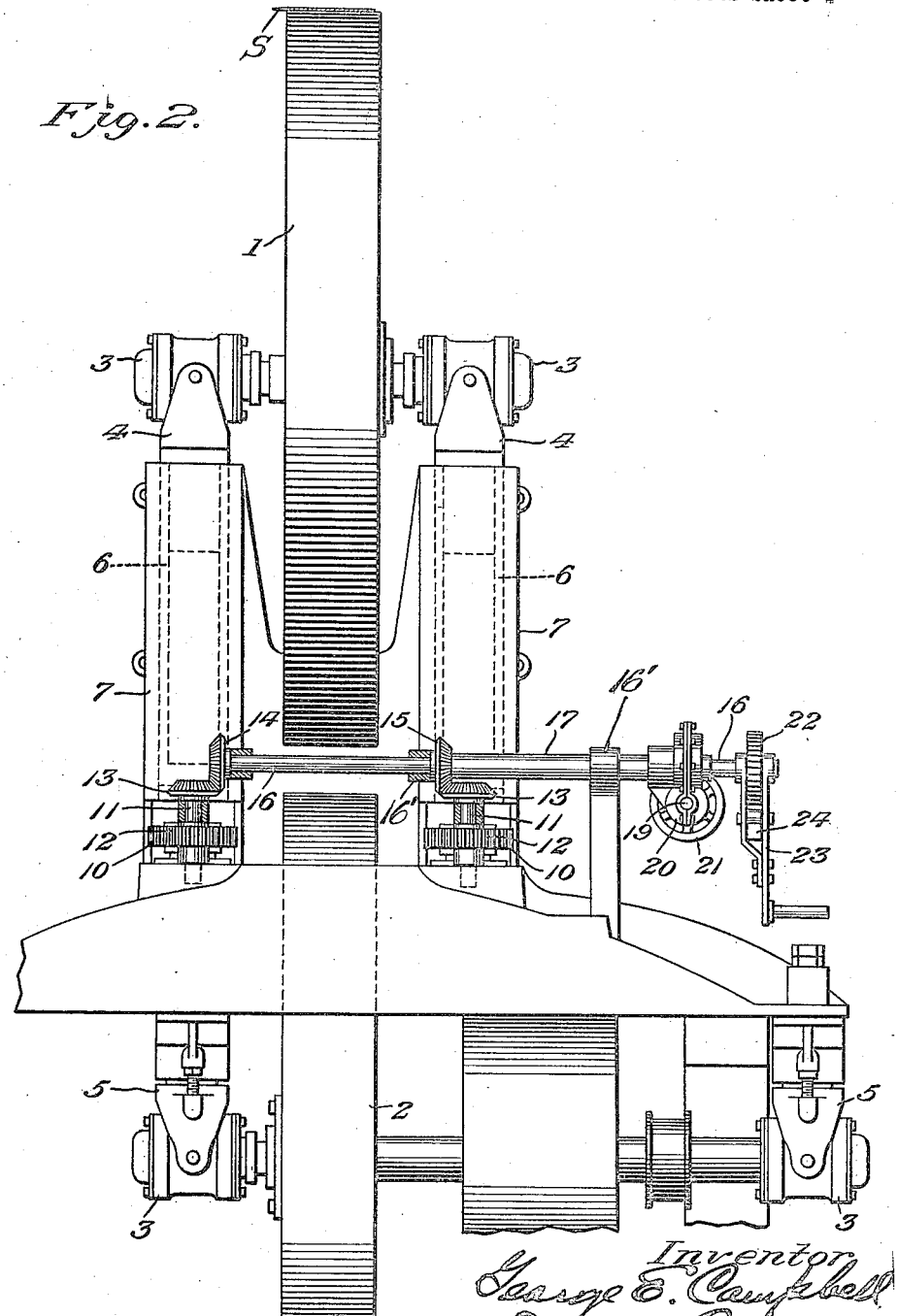

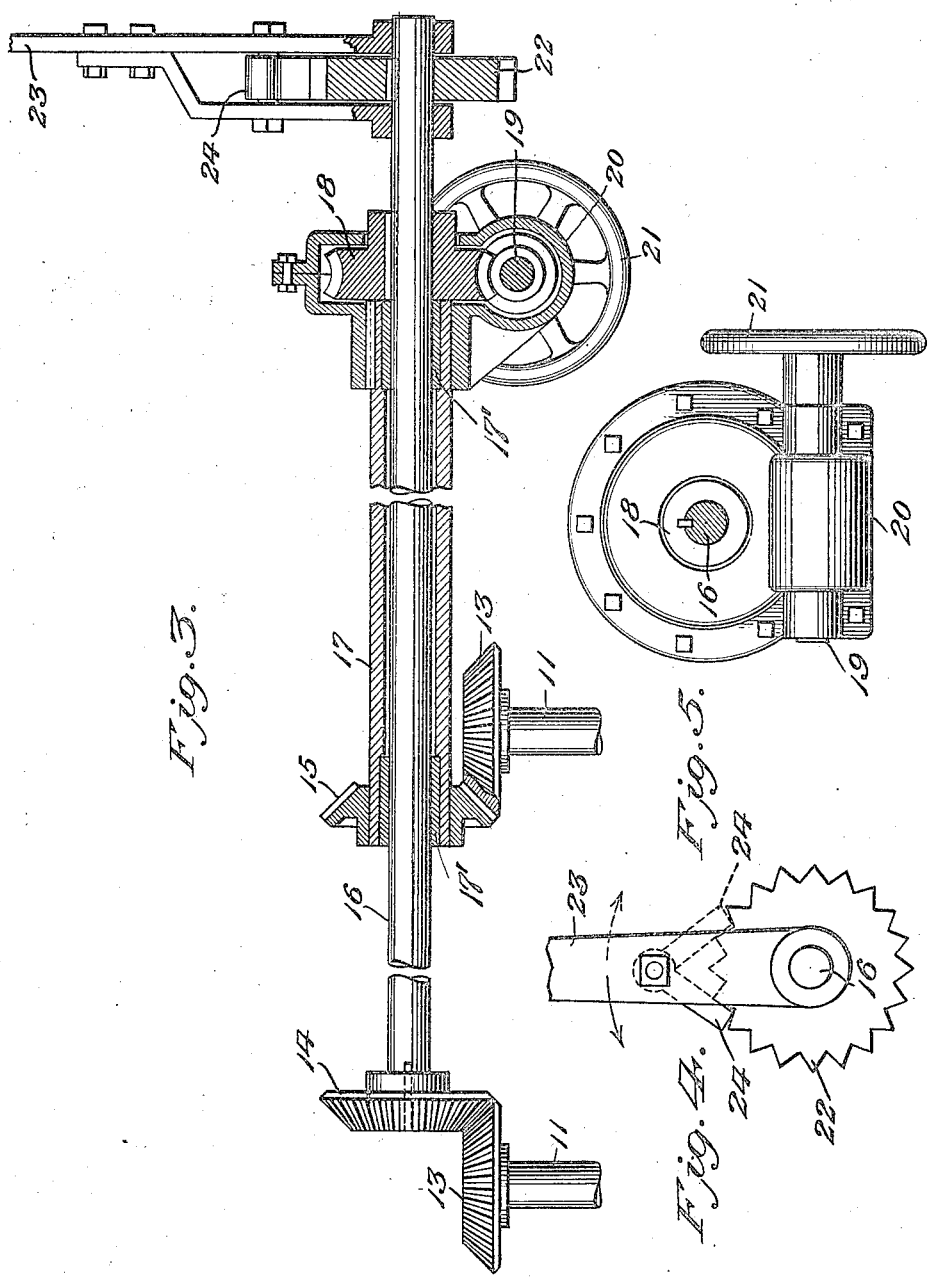

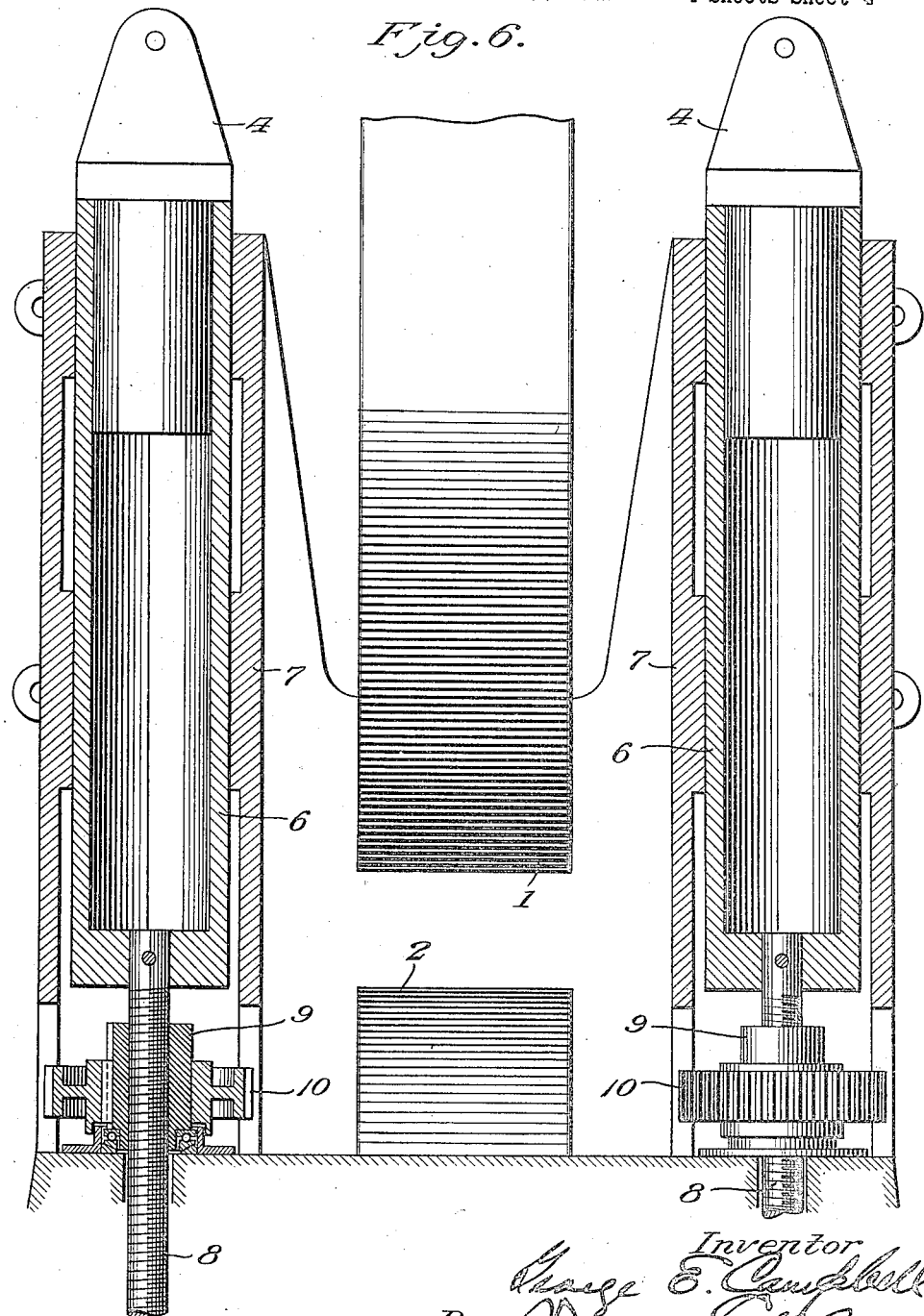

1,486,632

UNITED STATES PATENT OFFICE.

GEORGE E. CAMPBELL, OF CHATTANOOGA, TENNESSEE, ASSIGNOR TO THE WHELAND COMPANY, OF CHATTANOOGA, TENNESSEE, A CORPORATION OF TENNESSEE.

TILT SHAFT FOR BAND MILLS.

Application filed March 31, 1922. Serial No. 548,351.

*To all whom it may concern:*

Be it known that I, GEORGE E. CAMPBELL, a citizen of the United States, residing at Chattanooga, in the county of Hamilton and State of Tennessee, have invented certain new and useful Improvements in Tilt Shafts for Band Mills, of which the following is a specification.

This invention relates to an improvement in tilt shafts for band mills.

The object is to provide an arrangement for tilting the upper wheel of a band-mill, which is sometimes necessary in order to make the steel band saw run properly on the two wheels.

In the accompanying drawings:

Fig. 1 is a side elevation, partly in section;

Fig. 2 is an end view;

Fig. 3 is an enlarged detail;

Fig. 4 is a detail view of the ratchet wheel and pawl;

Fig. 5 is a view of the worm casing and hand wheel;

Fig. 6 is a sectional view through the sleeves.

The numerals 1 and 2 represent the upper and lower saw wheels, and S is the saw. The saw shafts are supported in bearings 3 at points above and below the base, and these bearings are carried in yokes 4 and 5. The yokes 4 are supported at the upper end of the sleeves 6, and these sleeves 6 are slidable up and down in hollow columns 7, to which they are fitted.

These sleeves 6 may be raised and lowered in any convenient way, as for instance through pins 8 secured in the bottoms of the sleeves. These pins are threaded through nuts 9, internally screw-threaded to correspond to the threads on the pins to which are keyed gear-pinions 10.

Vertical shafts 11 have gears 12 on their lower ends, which mesh with the gear pinions 10. Bevel pinions 13 are keyed to their upper ends as shown in Fig. 3, and these mesh with bevel pinions 14 and 15, which are keyed respectively to the shaft 16 and the concentric sleeve-shaft 17. The shaft 16 and sleeve 17 are rotatably mounted in suitable bearings 16', Fig. 2. The sleeve 17 is spaced from the shaft 16 by bushings 17' which permit the shaft and sleeve to turn independent of each other.

Likewise keyed to the shaft 16 is a worm-wheel 18, and a worm-shaft 19 carried by the worm casing 20, keyed to the sleeve 17 has its threads meshed with the threads of the worm-gear. On the worm is a handwheel 21, by which the worm-shaft 19, worm wheel 18, shaft 16, and gear 14 are turned in order to raise or lower one of the sleeves 6 and one side of the upper saw wheel 1 in order to tilt the wheel to make the band saw run properly on the two wheels.

As a means for turning the shaft 16 and sleeve 17 with the gears 14 and 15 thereon as a unit, a ratchet-wheel 22 is keyed to the shaft 16, and an operating lever 23 mounted thereon has a pawl 24 engaging the teeth of the ratchet-toothed wheel 22 for imparting a step by step rotary movement to the shaft and sleeve as a unit, when it is desired to raise both ends of the shaft or upper wheel uniformly. In other words, by revolving the shaft 16 through the ratchet mechanism, not only is the shaft itself turned, but also the sleeve, as the worm and worm-wheel lock the sleeve and shaft together, all of which is necessary in order that the upper wheel may be lowered or raised exactly the same on both sides when the saws are changed.

I claim:

1. Means for tilting a saw-shaft, including movable supports for the opposite ends thereof, horizontal concentric shafts connected with said movable supports, and means for turning one or both of said shafts for raising or lowering said movable supports.

2. The combination with a saw shaft and saw-wheel mounted thereon, of means for tilting the saw shaft, including movable supports for the opposite ends thereof, concentric shafts geared to the movable supports, and means for turning either or both of said shafts.

3. The combination with a saw shaft and saw wheel mounted thereon, of means for tilting the saw shaft, including movable supports for the opposite ends thereof, concentric shafts geared to the movable supports, and a worm and worm-wheel connected to one of the shafts for raising or lowering one of the movable supports and tilting the saw-shaft and wheel.

4. The combination with a saw shaft and saw wheel mounted thereon, of means for tilting the saw shaft, including movable supports for the opposite ends thereof, concentric shafts geared to the movable supports, and a ratchet wheel and pawl connected with one of the shafts for simultaneously raising or lowering both ends of the saw shaft and wheel.

5. The combination with a saw shaft and wheel mounted thereon, of means for tilting the saw shaft including movable supports for the opposite ends thereof, pins connected with the movable supports and having threads thereon, nuts screw-threaded on said pins, gears keyed to said nuts, vertical shafts having gear-pinions meshing with said gears and having bevel-gears on the ends thereof, a concentric shaft and sleeve each having bevel-gears meshing with the first-mentioned bevel-gears, and a worm and worm-wheel connected with the sleeve for raising or lowering one of the movable supports and tilting the saw shaft and wheel.

6. The combination with a saw shaft and wheel mounted thereon, of means for tilting the saw shaft including movable supports for the opposite ends thereof, pins connected with the movable supports and having threads thereon, nuts screw-threaded on said pins, gears keyed to said nuts, vertical shafts having gear-pinions meshing with said gears and having bevel-gears on the ends thereof, a concentric shaft and sleeve, each having bevel gears meshing with the first mentioned bevel gears, and means connected with the sleeve for raising or lowering one of the movable supports for tilting the saw shaft and wheel, and means connected with the shaft for simultaneously turning the shaft and sleeve for raising or lowering the saw shaft and wheel.

In testimony whereof I affix my signature.

GEORGE E. CAMPBELL.